United States Patent [19]
Laing

[11] 3,892,448
[45] July 1, 1975

[54] SPHERICAL PLAIN BEARING

[76] Inventor: Nikolaus Laing, Hofener Weg 35 bis 37, 7141 Aldingen bei Stuttgart, Germany

[22] Filed: Aug. 10, 1973

[21] Appl. No.: 387,455

[52] U.S. Cl. ............................ 308/230; 308/187.1
[51] Int. Cl. ......................................... F16c 17/06
[58] Field of Search ......... 308/230, 233, 159, 187.1

[56] References Cited
UNITED STATES PATENTS
2,634,177   4/1953   Guibert............................. 308/230
3,590,720   7/1971   Siegal............................... 308/230

Primary Examiner—M. Henson Wood, Jr.
Assistant Examiner—Richard A. Bertsch
Attorney, Agent, or Firm—Pennie & Edmonds

[57] ABSTRACT

A spherical plain bearing having bearing elements moveable in relation to each other and forming the boundary of a limiting bearing clearance having, a device surrounding the limiting clearance between the bearing elements which prevents the ingress of solid particles into the bearing clearance. The device may comprise an elastic cuff which prevents the entry of solid particles or a blade ring attached to a rotating element which imposes a centrifugal acceleration on the medium surrounding the limiting clearance.

7 Claims, 3 Drawing Figures

SPHERICAL PLAIN BEARING

THE PRIOR ART

Spherical plain bearings for the support of magnetically stabilised pump impellers are known which form a single unit with a pole ring having a spherical pole surface. Such spherical plain bearings, which consist of two bearing cups and a bearing ball placed between them, are subject to almost no wear when the pumped medium is free of solid admixtures or sediment-forming substances. In hydrodynamic bearings with spiral grooves, these spiral grooves are susceptible to being clogged by solids, when these are present, so that the hydrodynamic effect breaks down. Even in self-lubricating bearings, e.g. when either the ball or the cup consist of graphite, the wear can reach high rates when solids are added to the liquids to be pumped and enter the bearing clearance.

OBJECT OF THE INVENTION

The aim of the invention is a plain bearing which is suitable in pumping devices for the pumping of media containing solid particles.

DESCRIPTION OF THE INVENTION

To accomplish this task, the invention provides an arrangement in a spherical plain bearing for the mutual support of two machine elements rotating in relation to each other and consisting of a bearing element with a concave spherical sliding surface and a sliding body with a convex spherical sliding surface wherein the limiting clearance of the sliding surfaces is surrounded with a device which prevents the ingress of solid particles into the bearing clearance. This device may be a sealing ring between the rims of two bearing cups rotating in relation to each other which envelop a bearing ball. The sealing ring lightly touches the at least one of the cup rims. This simple measure makes it possible to operate spherical plain bearings free of wear. In order to reduce the friction of the sealing ring over the cup rims, the sealing ring according to the invention has outward facing and axially pre-loaded sealing lips. In this way, the tilting of the rotating component in relation to the stationary component is also uninhibited in operation.

Furthermore, it has been found profitable to make the inside diameter of the sealing ring larger than the outside diameter of the ball so that the ball, apart from rotating about the axis of rotation, can also perform random rotations about other axes whereby groove formation is avoided.

The sealing presents difficulties when the lubrication, as for example in acid pumps, is to be accomplished with powerfully corrosive media, since no elastic materials are known which can resist the attack of the media.

To this end, the invention also provides centrifugal separators by which solid suspended particles of a higher specific gravity than the pumped liquid are kept away from the sliding clearance. For this purpose, blades or projections are arranged in a blade ring around the rim of the rotating cup so that the liquid space adjacent to the clearance between the ball and the cups becomes a rotating liquid ring, the centrifugal field of which throws all solid particles towards the outside and thus removes them from the vulnerable region.

The invention will be explained, by way of example, with the help of figures.

Figure 1:
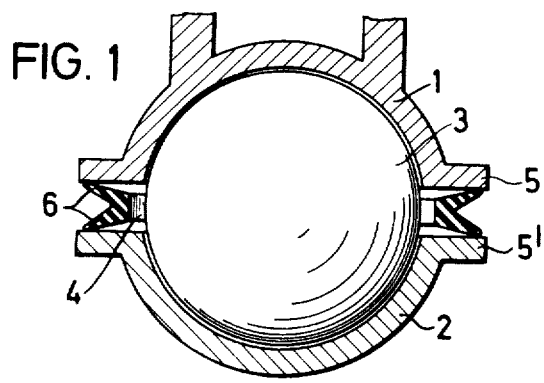
FIG. 1 shows diagrammatically a plain bearing according to the invention with two bearing cups and a bearing ball, in which a sealing ring is provided between the rims of the bearing cups.

In an example of the embodiment according to FIG. 1, a bearing ball 3 is provided between the bearing cups 1 and 2. The bearing cups 1 and 2 have rim flanges 5 and 5', between which a sealing ring 4, made of elastic material, is placed. The sealing ring has the cross-section of a dovetail. The spread lips 6 forming part of the sealing ring cross-section just touch the surfaces facing each other 5 and 5' of the bearing cup flanges 5 and 5'.

Figure 2:
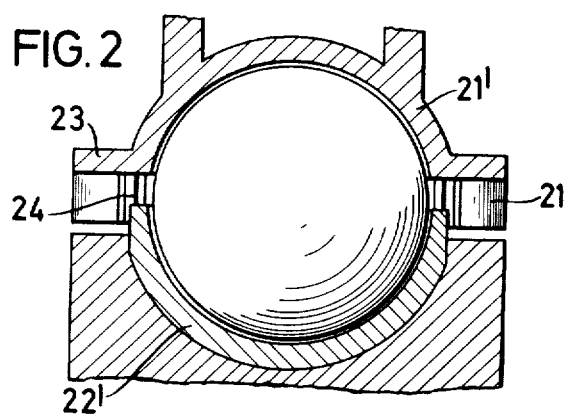
FIG. 2 shows, in cross-section, a sliding bearing with two bearing cups and a bearing ball, in which a blade ring is provided around the rim of a bearing cup.

In FIG. 2, another form of embodiment is shown, in which the bearing cup 22' of the plain bearing is attached to a stationary machine element. The bearing cup 21' belongs to the rotating machine element. Blades 21 are arranged on the rim flange 23 of the bearing cup 21'. These blades form a blade ring which imposes a centrifugal acceleration on the medium surrounding the limiting clearance 24 so that dirt particles, which are heavier than the pumped medium, cannot enter the limiting clearance 24. This bearing is also suitable for application in corrosive media, as, for example, acids or the like, where elastic seals cannot be used.

Figure 3:
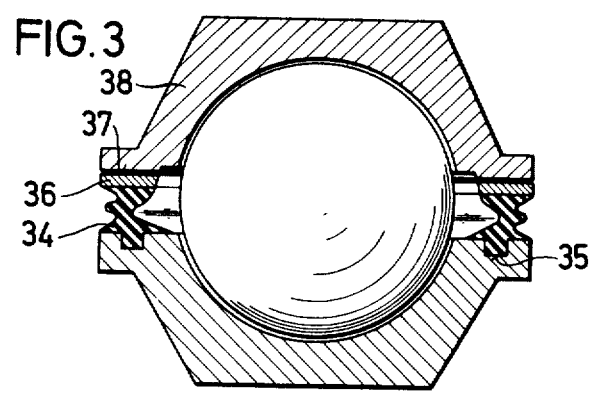
FIG. 3 shows a similar form of embodiment as FIG. 1, wherein a sliding ring, attached to one bearing cup, forms a sliding seal with the rim of the other bearing cup.

A form of embodiment is shown in FIG. 3 in which a sealing ring 34 with the illustrated cross-section is inserted into a slot 35 at the rim of a bearing cup. The sealing ring is bonded to a sliding ring 36, the free surface 37 of which slides over the rim of the other bearing element 38.

I claim:

1. A spherical bearing for the mutual support of two machine elements comprising two cups each having a concave spherical sliding surface which cups are universally pivotable with respect to each other through limited arcs of travel, a single body having a convex spherical surface slidable on the convex sliding surface of each cup and axially separating said cups for a limiting clearance, and a sealing device positioned axially between said cups and surrounding said limiting clearance for preventing entry of particles between the concave surfaces of said cups and the convex surface of said body.

2. A spherical bearing according to claim 1 characterized in that the sealing device comprises a sealing ring which abuts against the two cups.

3. A spherical bearing according to claim 1 wherein each said cup has a rim and wherein said sealing device touches the rim of each said cup.

4. A spherical bearing according to claim 3 wherein said sealing device has a cross-section in the shape of a dovetail including protruding lips and wherein said protruding lips abut against said rims.

5. A spherical bearing according to claim 3 wherein the inside diameter of said sealing device is greater than the diameter of said body by more than two bearing clearances.

6. A spherical bearing according to claim 3 wherein the sealing device comprises an elastic material firmly attached on one side to the rim of one sealing cup and is bonded on another side to a ring which slides over the rim of the other cup.

7. A spherical bearing according to claim 1 wherein said sealing device comprises a bladed ring with channels between said blades which extend in a radial direction and which is connected to one rotatable portion of the bearing.

* * * * *